United States Patent
Jiang et al.

(10) Patent No.: US 6,680,688 B1
(45) Date of Patent: Jan. 20, 2004

(54) MEASURING SYSTEM AND METHOD FOR DETECTING OBJECT DISTANCE BY TRANSMITTED MEDIA WITH DIFFERENT WAVE VELOCITIES

(75) Inventors: Shyh-Biau Jiang, Taoyuan Hsien (TW); Hung-Chuan Chien, Taoyuan Hsien (TW); Dong-Liang Lee, Taoyuan Hsien (TW); Chi-Ming Yang, Taoyuan Hsien (TW); Hsin-Ming Chang, Taoyuan Hsien (TW); Chuan-Fu Huang, Taoyuan Hsien (TW)

(73) Assignee: Viewmove Technologies, Inc., Taoyuan Hsien (TW)

( * ) Notice: Subject to any disclaimer, the term of this patent is extended or adjusted under 35 U.S.C. 154(b) by 0 days.

(21) Appl. No.: 10/339,347

(22) Filed: Jan. 10, 2003

(30) Foreign Application Priority Data

Dec. 9, 2002 (CN) .......................................... 91135599 A

(51) Int. Cl.$^7$ ......................... G01S 13/86; G01S 13/06; G01S 13/93
(52) U.S. Cl. .............................. 342/52; 342/27; 342/53; 342/54; 342/59; 342/118; 342/195; 342/70; 367/93; 367/99; 367/117; 367/118; 367/124; 367/128; 356/3; 356/4.01; 701/1; 701/300; 701/301; 340/435; 340/436; 340/438
(58) Field of Search .................... 180/167, 168, 180/169; 340/945, 961, 425.5, 436, 435, 438, 439, 463, 682; 701/300, 301, 1, 36; 356/3, 4.01–5.15, 6–22; 367/87–117, 118–130; 342/24, 27, 28, 41, 52–59, 70–72, 118–146, 175, 192, 193–197; 703/13; 73/584, 596, 597, 601

(56) References Cited

U.S. PATENT DOCUMENTS

| | | | | |
|---|---|---|---|---|
| 4,015,232 A | * | 3/1977 | Sindle | 367/111 |
| 4,500,977 A | * | 2/1985 | Gelhard | 367/108 |
| 4,620,185 A | * | 10/1986 | Plahmer | 340/682 |
| 5,005,147 A | | 4/1991 | Krishen et al. | 703/13 |
| 5,140,859 A | * | 8/1992 | Shah | 73/597 |
| 5,418,758 A | | 5/1995 | Webster | 367/101 |
| 5,471,214 A | * | 11/1995 | Faibish et al. | 342/70 |
| 5,508,974 A | | 4/1996 | Meyer et al. | 367/99 |
| 5,781,147 A | * | 7/1998 | Elliott et al. | 342/54 |
| 6,042,050 A | * | 3/2000 | Sims et al. | 342/54 |
| 6,061,015 A | * | 5/2000 | Sugimoto | 342/71 |
| 6,064,330 A | * | 5/2000 | Elliott et al. | 342/54 |
| 6,108,592 A | * | 8/2000 | Kurtzberg et al. | 701/1 |
| 6,297,732 B2 | * | 10/2001 | Hsu et al. | 340/439 |
| 6,452,535 B1 | * | 9/2002 | Rao et al. | 342/72 |
| 6,492,935 B1 | * | 12/2002 | Higuchi | 342/70 |
| 6,590,521 B1 | * | 7/2003 | Saka et al. | 342/70 |

FOREIGN PATENT DOCUMENTS

GB        2378597 A    *  2/2003  ........... G01S/13/87

* cited by examiner

*Primary Examiner*—Bernarr E. Gregory
(74) *Attorney, Agent, or Firm*—Pennie & Edmonds LLP

(57) ABSTRACT

A measuring system and method of detecting an object distance by transmission media with different wave velocities are described. The measuring system has a computer, a primary detector and a secondary detector. The primary detector is connected to the computer through bus communication and the secondary detector connected to the primary one through two different transmission media. The primary detector is able to receive separately a first signal and a second signal emitted simultaneously from the secondary detector through the transmission media. Moreover, the first signal has light-speed and the second signal has sound-speed. To calculate the distance between the objects which the primary and the secondary detector are attached respectively. The delay time of second signal and the wave velocity of the supersonic media are multiplied.

20 Claims, 6 Drawing Sheets

MEASURING SYSTEM AND METHOD FOR DETECTING OBJECT DISTANCE BY TRANSMITTED MEDIA WITH DIFFERENT WAVE VELOCITIES

FIELD OF THE INVENTION

The present invention generally relates to a measuring system and method for detecting an object distance, and more particularly, to a measuring system and method for detecting an object distance using more than one of the transmitted media with different wave velocities, respectively.

BACKGROUND OF THE INVENTION

The use of automatic measuring systems has become increasingly important with the rapid development of industrial techniques. For example, to avoid collisions, drivers must carefully park cars in parking spaces and an automated guided vehicle (AGV) transports goods to suitable position to keep away from obstacles.

U.S. Pat. No. 4,500,977 discloses "a method and apparatus for measuring a distance using ultrasonic echo signals, particularly for use on a motor vehicle" to detect and show the distance between vehicle and obstacles. Additionally, U.S. Pat. No. 4,015,232 discloses "Ultrasonic distance detector for vehicles". The ultrasonic distance detector for vehicles uses a plurality of transducers located around the sides of the vehicle. Each of the transducers is connected to a receiver for detecting sonic echoes from too close objects. The output of each receiver is connected to individual indicator lamps and if any of the lamps are energized, the driver is warned that a part of the vehicle is in danger of a collision.

Particularly, a space position system has to detect a distance of the articles to locate precisely and quickly the objects. Conventionally, the measuring system uses ultrasonic waves as measuring media in the air and detects the object distance by reflective ultrasonic waves. FIG. 1 shows a reflective measuring system using ultrasonic waves in the prior art.

The conventional measuring system using reflective ultrasonic waves usually has an ultrasonic transducer-transmitted 100, an ultrasonic transducer-received 102, an object 104 and a peripheral circuit (not shown). The ultrasonic transducer-transmitted 100 and the ultrasonic transducer-received 102 are connected to the peripheral circuit. There is a distance between the object 104 and the ultrasonic transducer-transmitted 100 and the ultrasonic transducer-received 102.

During an operation, incident sound waves 106 generated by the ultrasonic transducer-transmitted 100 are partially reflected off the surface of the object 104. A portion 106a of the reflected sound waves is received by the ultrasonic transducer-received 102 and another portion 106b of the incident sound waves 106 form reflected sound waves 106b in the air due to obstructive articles 108 in the environment. Also, the reflected sound waves 106b are often reflected to the transducer-received 102. Afterwards, the incident sound waves 106 are formed by the ultrasonic transducer-transmitted 100 and processed by the peripheral circuit to compute the distance between the object 104 and the ultrasonic transducer-transmitted 100. However, the effect of the reflected waves of the obstructive articles 108 is totally ignored.

A conventional measuring system with reflective ultrasonic waves uses a principle, $2L=T \times V$. L is a measurement distance between the object 104 and the ultrasonic transducer-transmitted 100, T is the time for transmission of ultrasonic waves from the ultrasonic transducer-transmitted 100 to ultrasonic transducer-received 102, and V is the velocity of the sound waves.

The conventional measuring system has many disadvantages. For example, during measurement, many obstacles 108 other than the desired object 104 interfere with the sound wave reflections so that the ultrasonic transducer-received 102 receives reflective sound waves 106b resulting from the desired object 104 and the obstacles 108. If the obstacles 108 are closer to the ultrasonic transducer than to the desired object 104, the ultrasonic transducer-received 102 acquires instantly the reflective sound waves 106b from the obstacles 108. Therefore, the sound waves 106a reflected from the object 104 interfere with those of the obstacles, resulting in an imprecise measurement of object distance.

U.S. Pat. No. 6,166,995 discloses "Apparatus for distance measurement by means of ultrasound" that the ultrasonic pulses from respective ultrasonic transducers are superimposed on each other when no obstacle is detected during sequentially propagating ultrasonic pulses. In addition, U.S. Pat. No. 5,508,974 describes "Method and device for ultrasonic distance measuring." In a device for measuring the distance to an obstacle, a second transmission pulse as a control measurement for an ultrasonic distance measurement is transmitted only when an echo signal has been received for a first transmission pulse. Further, a timing window, within which the expected echo signal falls when it is reflected by an obstacle, is created.

Specifically, when positioned in an open space, the object 104 is difficult to measure since the geometric shapes of the object 104 is irregular due to an uncertain transmission time of the sound waves resulting in a poor computation precision for the peripheral circuit. Moreover, the intensity of the ultrasonic waves is inversely proportional to a distance away from the ultrasonic transducer-transmitted 100 in the air when a reflective measuring system is used for distance measurement. As a result, the signal/noise (S/N) ratio of the reflective ultrasonic detecting system is severely degraded, which leads to a poor measurement precision.

Furthermore, the transmission distance of the ultrasonic waves is at least double distance comparative to the distance between the object 104 and the ultrasonic transducer-transmitted 100. Even with the irregular surface of the object 104, the transmission distance of the sound waves is much higher than the object distance leading to poor measurement efficiency. U.S. Pat. No. 5,418,758 discloses "Distance measurement system" utilized two reflectors mounted in different positions, respectively to receive reflected signals. U.S. Pat. No. 5,140,859 describes "Long range ultrasonic distance measuring system" that two transducers are placed different locations. A pulse signal is generated by the master transceiver, which requires a time period of t1 to travel to the slave transceiver. After a time delay of t2 upon the receipt of the pulse signal by the slave transceiver it transmits a response signal back to the master transceiver. The response signal requires the same time period of t1 to be received by the master transceiver. The distance between the master transceiver and the slave transceiver is determined by an equation of $2 \times t1 + t2$.

Consequently, how to eliminate the interference with the reflective sound waves is a problem and how to reduce the transmission length of the sound waves for the measuring system manufacturers is currently a main issue.

SUMMARY OF THE INVENTION

One object of the present invention is to utilize a measuring system and method of detecting an object distance using a plurality of transmitted media with different wave velocities including light-speed waves (infrared rays or radio waves) and sound waves (ultrasonic waves). By simultaneously emitting the ultrasonic waves and infrared waves from a secondary detector to a primary detector and recording a time difference between the ultrasonic waves and the infrared waves, the object distance equal to the primary and secondary detector is obtained.

Another object of the present invention is to use a measuring system and method of detecting an object distance using transmitted media with different wave velocities including light-speed waves and sound-speed waves. The secondary detector is notified of the transmission of the light-speed waves and the sound-speed waves by using another light-speed waves so that the primary detector directly receives the sound-speed waves and light-speed waves from the secondary detector to compute a time difference between light-speed waves and sound-speed waves. Therefore, a reflective measuring system in the prior art is interfered with sound-speed waves from other obstacles for no purpose of distance measurement.

Still another object of the present invention is to use a measuring system and method of detecting an object distance using transmitted media with different wave velocities including light-speed waves and sound-speed waves. The light-speed medium serves as a communication media to establish a communication channel between the primary detector and the secondary detector. Such a communication channel can eliminate the unreasonable measurement result with errors to increase the measurement reliability.

According to the above objects, the present invention sets forth a measuring system and method of detecting an object distance using a plurality of transmitted media with different wave velocities. The measuring system has a computer, a primary detector and a secondary detector. The medium of transmitting a first signal and a second signal are preferably infrared waves with light-speed and ultrasonic waves with sound speed, respectively. The computer has a user interface to send a detection command to the primary detector by a communication interface (such as a serial port). Detecting results including a time difference and an object distance equal to the product of the time difference and the velocity of the first signal are displayed on the user interface of the computer. Since the velocity of the first signal is considerably higher than that of the second signal and a short transmission distance of the second signal (sound-speed wave), the transmission time of the first signal can be ignored but maintain a precise detecting.

In the present invention, the primary detector includes a serial communication device, a processing device, a sensor and a wireless communication device. The hardware structure of the secondary detector is typically similar to that of the primary detector except the serial communication device connected to the computer. Specifically, the communication device, the processing device and the sensor have many different functions on the basis of required measurement.

The primary detector mainly has a serial communication device, a first processing device, a first sensor and a wireless communication device. The primary detector is coupled to the computer by the serial communication device. The first processing device is coupled to the serial communication device, the first sensor and the wireless communication device, respectively. The primary detector transmits a signal-launching command responsive to the detection command of the computer by using the first sensor and the wireless communication device so that the first sensor simultaneously receives the first signal and the second signal. The first processing device is used to compute a time difference of the first signal and the second signal, respectively, sent to the first sensor. Therefore, a product, the object distance, of the velocity of the second signal in the first processing device and the time difference is obtained.

The secondary detector coupled to the primary detector has a second sensor, a wireless communication device and a second processing device. The second sensor and wireless communication is connected to the second processing device to serve as a message communication. The secondary detector is connected to the primary detector by the second sensor and wireless communication. When the secondary detector receives the signal-launching of the primary detector, the signal-launching is then sent to and identified by the second processing unit and. The second sensor and wireless communication thus asynchronously transmits the first signal and the second signal to the first sensor and wireless communication.

In the present invention, the measuring system for detecting an object distance utilizes a secondary detector to transmit ultrasonic waves to the primary detector. However, a measuring system in the prior art uses reflected ultrasonic waves subject to noise resulting from the reflection of objects. By contrast, in the present invention, a direct transmission and separate reception of the first signal and the second signal has advantageously a noise-resistant feature in the environment and a high signal/noise ratio (SNR).

During an operation of the measuring system, the computer sends a detection command to a primary detector through a communication interface. Afterwards, a signal-launching command is transmitted to a secondary detector by the primary detector to respond to the detection command of the computer. A first signal and a second signal are simultaneously emitted into the primary detector by the secondary detector to respond to the signal-launching command of the primary detector.

The first signal and the second signal are then respectively received from the secondary detector by using a first sensor of the primary detector and the velocity of the first signal is much higher than that of the second signal. The first processing device calculates the time difference of the first signal and the second signal sent to the first sensor of the primary detector to obtain an object distance equal to the product of the time difference and the velocity of the second signal. Finally, the object distance is read in the primary detector and displayed on the computer.

Since the velocity of the first signal is much higher than that of the second signal, the transmission time of the first signal can be ignored so that the time calculation of the primary detector and the secondary detector is deemed as simultaneous. Therefore, the time difference from the primary detector to the secondary detector is the transmission time of the sound-speed waves. Furthermore, the time when the second signal is reflected on the primary detector is much longer than that when the second signal is transmitted to the primary detector. As a result, the initial measurement of the light-speed waves and sound-speed waves which arrive at the primary detector is able to avoid the interference with the reflective waves of the first signal.

More importantly, in the same object distance measurement, the transmission length of the second signal is half of the object distance acquired by the reflected ultrasonic waves in the conventional measuring system. Namely, the object distance is equal to the transmission length of the second signal from the secondary detector to the primary detector. During transmission, the decay of the second signal is largely reduced to increase the signal/noise ratio in the same object distance measurement.

In summary, the present invention utilizes a measuring system and method of detecting an object distance using transmitted media with different wave velocities. The first signal and the second signal have advantageously a noise-resistant feature. Moreover, the transmission length of the second signal in the present invention is preferably half of the object distance acquired by the reflective ultrasonic waves in the prior art.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying drawings, wherein.

DETAILED DESCRIPTION OF THE PREFERRED EMBODIMENT

The present invention is directed to a measuring system and method of detecting an object distance using transmitted media with different wave velocities to improve the shortcomings of a measuring system used in the prior art. The primary detector is allowed to receive separately a first signal and a second signal emitted from a secondary detector. A time difference between the first signal and second signal is recorded and computed sequentially by the primary detector to obtain an object distance. In the present invention, the first signal and the second signal have different wave velocities. The first signal includes a higher speed wave, such as light, and the second signal preferably includes a lower speed of sound waves, such as ultrasonic waves.

The measuring system utilizes different wave velocities including the first signal and the second signal both conveyed by the transmission medium, such as the air or the like. For example, the velocity of ultrasonic waves is about 340 m/s in the air. The light-speed of infrared rays or radio waves is about $3 \times 10^8$ m/s, extremely higher than that of the ultrasonic waves so that the light-speed waves can be neglected. Therefore, the time difference of the first signal and the second signal arriving at the primary detector is deemed as a transmission time of the ultrasonic waves in the transmission media.

As a result, the object distance is equal to a product of the time difference and the velocity of ultrasonic waves, described as: $L = T \times V$. L represents the object distance between the primary detector and the secondary detector, T is the transmission time of the ultrasonic waves between the primary detector and the secondary detector, and V is the transmission speed of the ultrasonic waves between the primary detector and the secondary detector.

Figure 1:
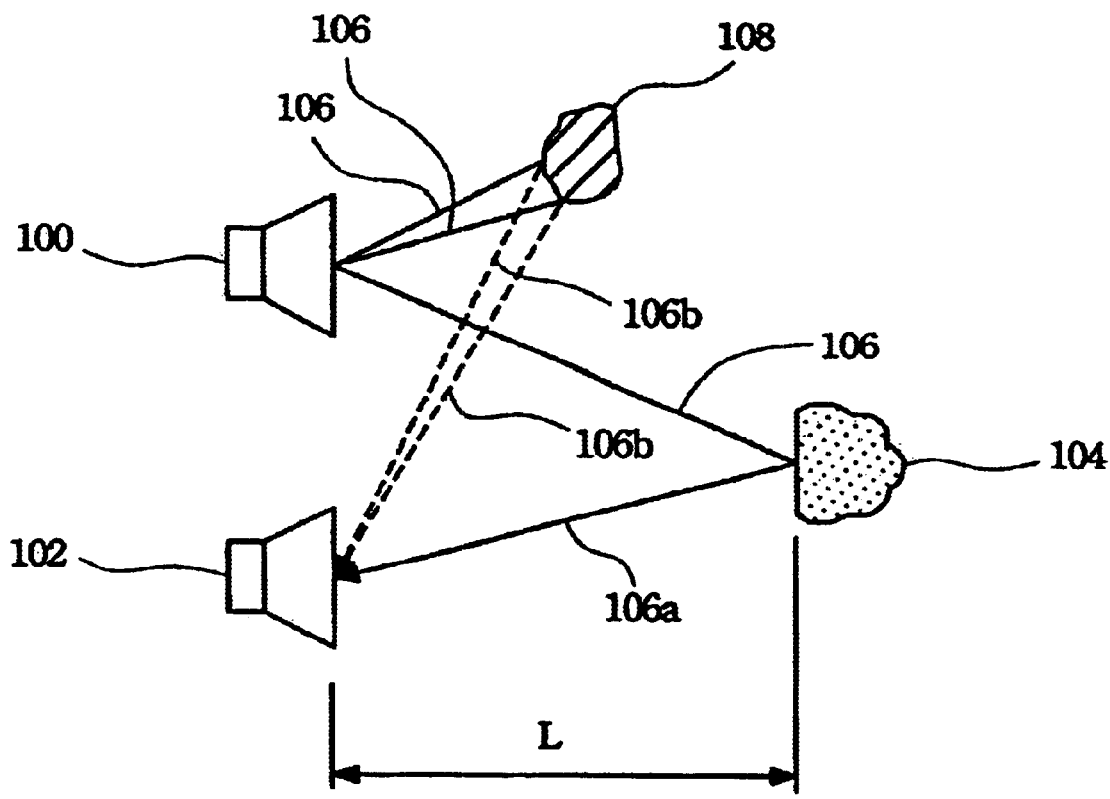
FIG. 1 illustrates a reflective measuring system using ultrasonic waves in the prior art.
Figure 2A:
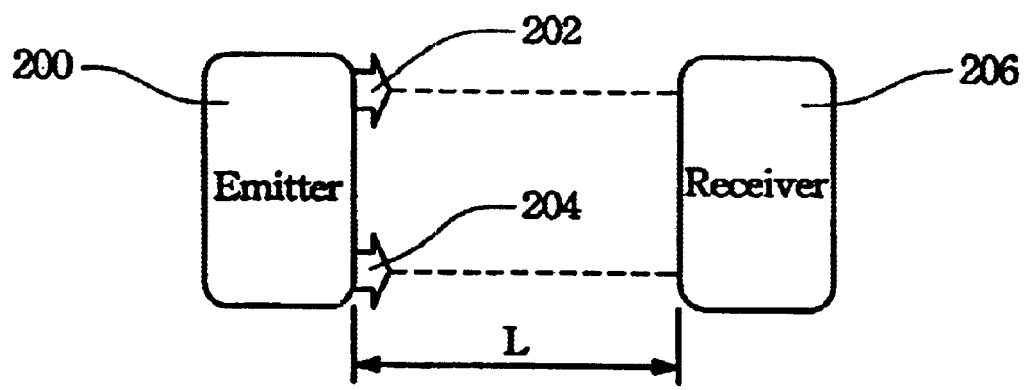
FIGS. 2A–2C illustrate a basic principle with different wave velocities in accordance with the present invention.
Figure 2B:
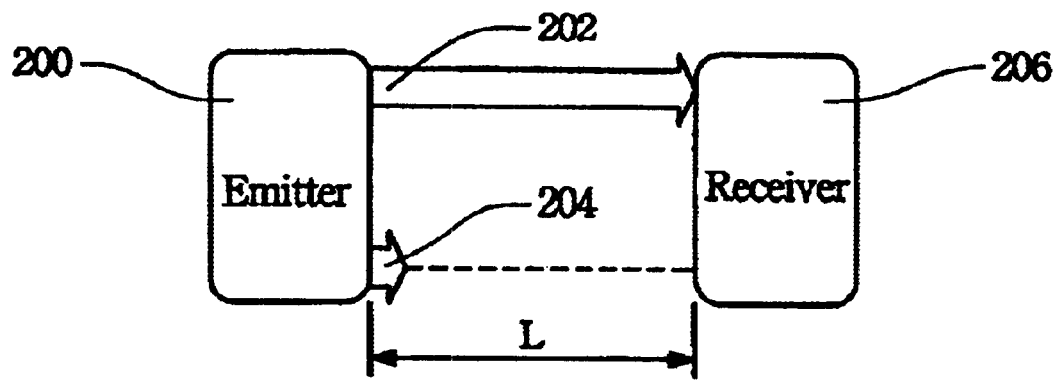
Figure 2C:
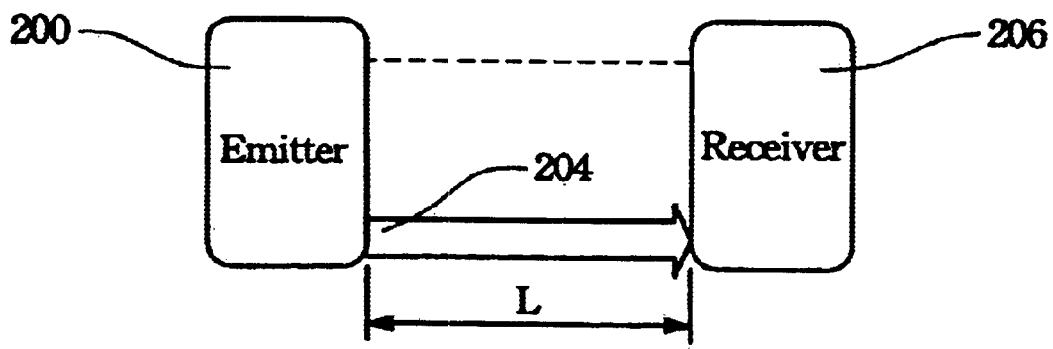

FIGS. 2A–2C show a basic principle with different wave velocities in accordance with the present invention. In FIG. 2A, an emitter 200 is prepared for simultaneous transmission of the first signal 202 and the second signal 204 to a receiver 206 and the receiver 206 is waiting to count the transmission time of the first signal 202. In FIG. 2B, since the velocity of the first signal 202 is higher than that of the second signal 204, the receiver 206 starts to count the transmission time when the first signal 202 instantly arrives at the receiver 206.

In FIG. 2C, after the receiver 206 acquires the second signal 204, the receiver 206 stops counting the transmission time. The distance between the emitter 200 and the receiver 206 can be computed by multiplying the time difference by the velocity of the second signal 204. The emitter 200 and the receiver 206 are mounted separately on objects to create a distance measurement, a length between the emitter 200 and the receiver 206. To illustrate clearly the present invention, an embodiment of the measuring system and method is set forth in details as follows.

Figure 3A:
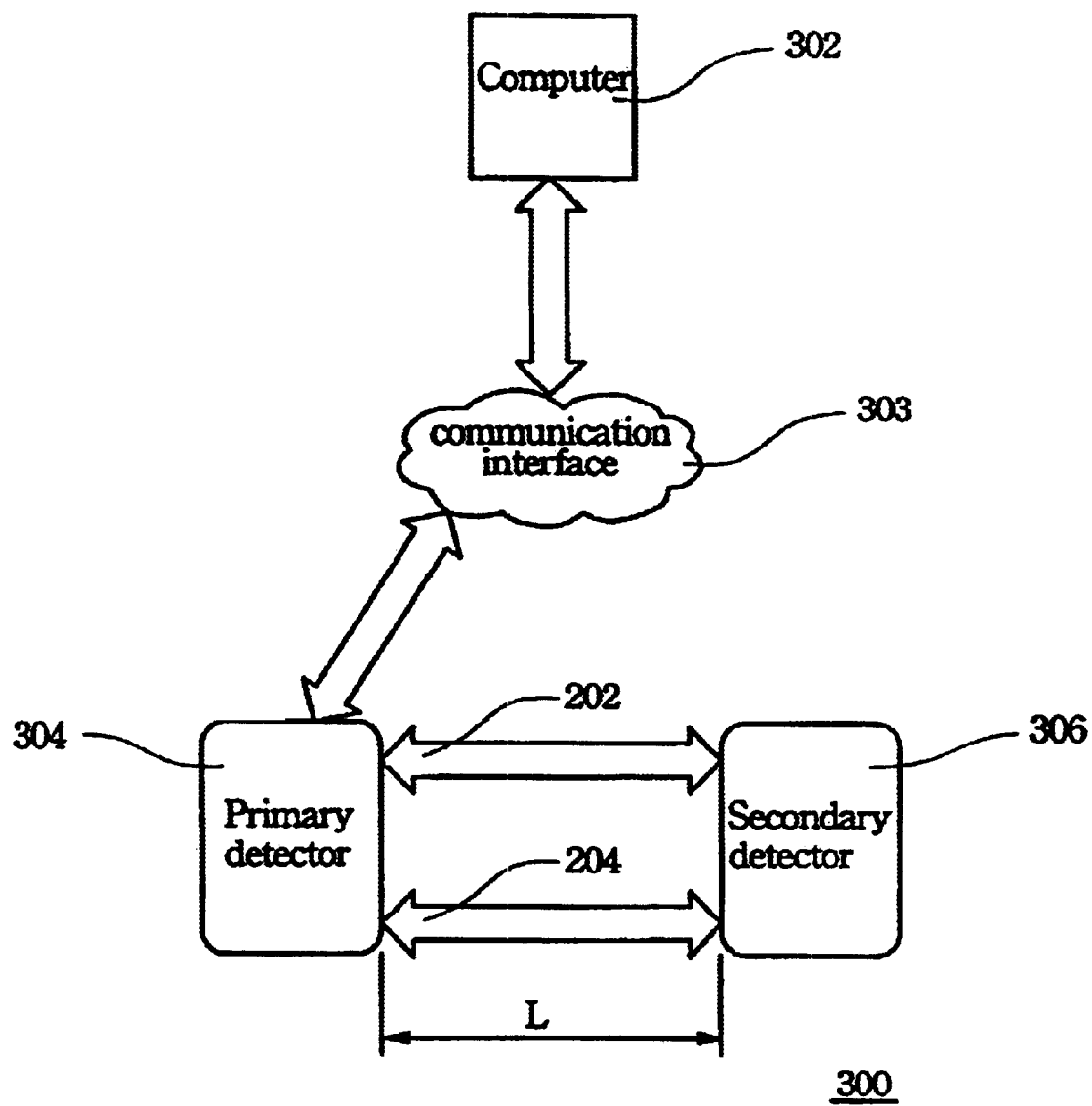
FIG. 3A illustrates a measuring system to detect an object distance using different wave velocities in accordance with a preferred embodiment of the present invention.

FIG. 3A shows a measuring system to detect an object distance using different wave velocities in accordance with a preferred embodiment of the present invention. The measuring system for detecting an object distance using transmitted media has a computer 302, a primary detector 304 and a secondary detector 306 so that the transmission media are used to transfer different wave velocities. The first signal is preferably infrared rays or radio waves with light-speed and the second signal is ultrasonic waves with sound-speed. The computer 302 has a user interface, such as a graphical user interface, and allows a communication interface to send a detection command to the primary detector 304. Detection results including the time difference and an object distance L equal to the product of the time difference and the velocity of the second signal 204 are displayed on the user interface of the computer 302. Since the velocity of the first signal 202 is considerably higher than that of the second signal 204 and a short transmission distance of the second signal (sound-speed wave) 204, the transmission time of the first signal 202 can be ignored but maintain a precise detecting.

In the preferred embodiment of the present invention, the communication interface includes a RS232 serial bus, a parallel bus, a universal serial bus (USB) or other communication protocols, such as cable or wireless. The first signal 202 includes light-speed waves, such as infrared rays or radio waves, and the second signal 204 includes sound-speed waves having a frequency range of about 38 to 41 kHz, preferably from 39 to 40 kHz.

Figure 3B:
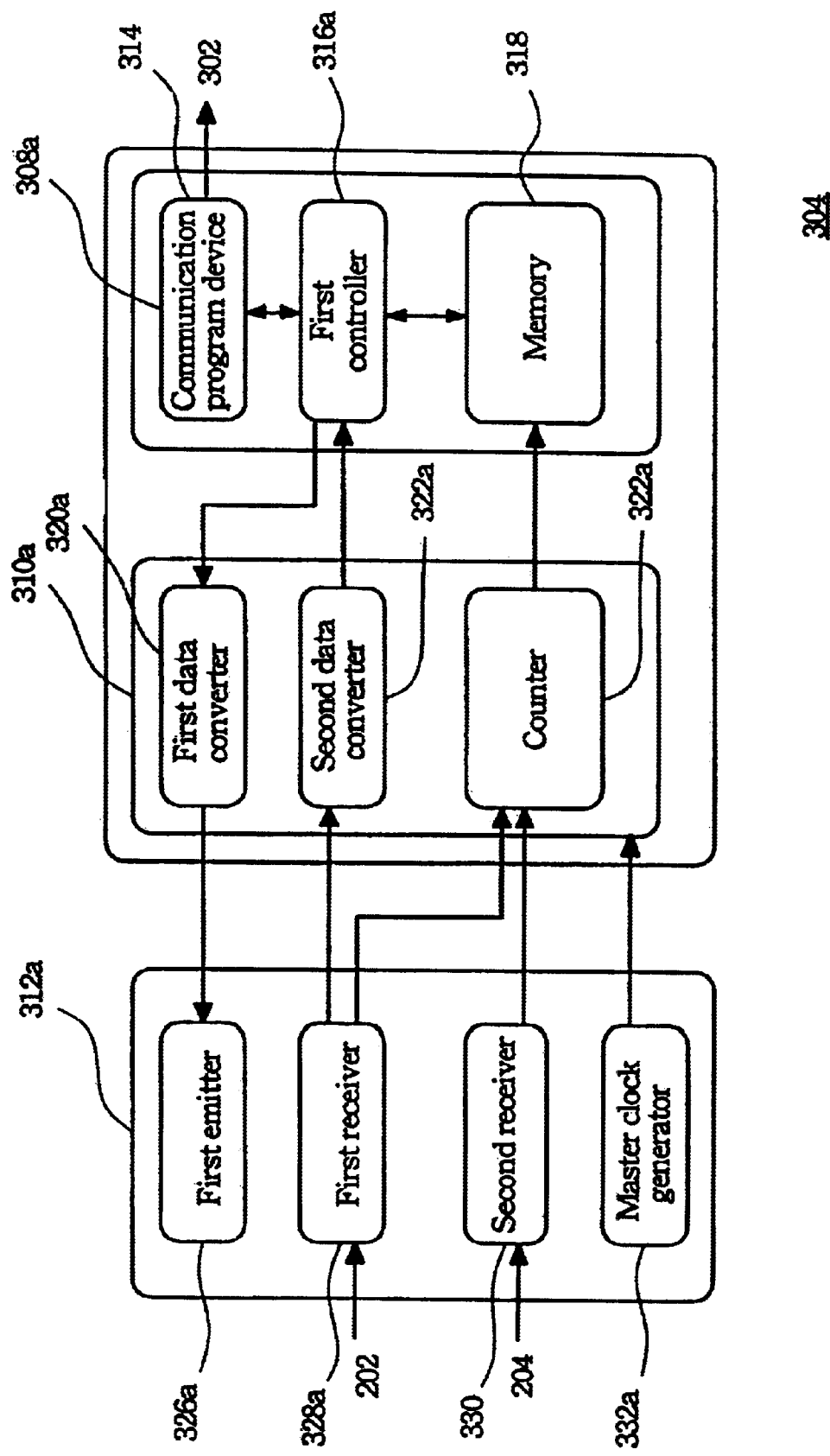
FIG. 3B illustrates a block diagram of a primary detector of a measuring system to detect an object distance using different wave velocities in accordance with a preferred embodiment of the present invention.

FIG. 3B shows a block diagram of the primary detector 304 of a measuring system to detect an object distance using different wave velocities in accordance with a preferred embodiment of the present invention. The primary detector 304 has a first communication device 308a, a first processing device 310a, a first sensor 312a and a first wireless device 326a. The primary detector 304 is coupled to the computer 302 by the first communication device 308a. The first processing device 310a is coupled to the first communication device 308a, the first sensor 312a and the first wireless device 326a, respectively. The primary detector 304 transmits a signal-launching command responsive to the detection command of the computer 302 to allow the first sensor 312a to receive separately the first signal 202 and the second signal 204 (FIG. 3B). The velocity of the first signal 202 is higher than that of the second signal 204 to generate a time difference. Therefore, a product, the object distance, of the velocity of the second signal 204 in the first processing device 310a and the time difference is obtained and the displayed on the computer 302 through the first communication device 308a.

Figure 3C:
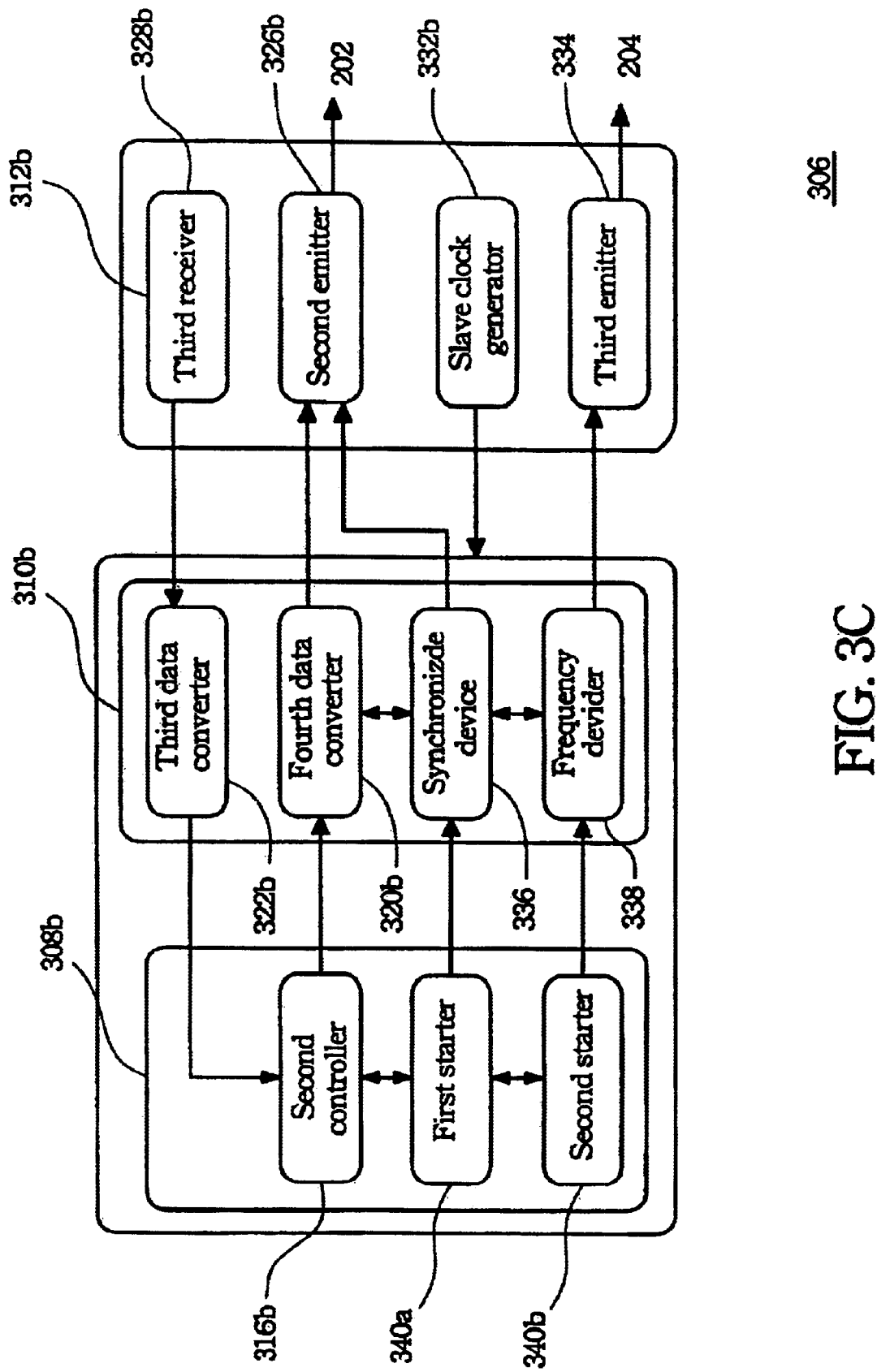
FIG. 3C illustrates a block diagram of a secondary detector of a measuring system to detect an object distance using different wave velocities in accordance with a preferred embodiment of the present invention.

FIG. 3C shows a block diagram of a secondary detector 306 of a measuring system to detect an object distance using different wave velocities in accordance with a preferred embodiment of the present invention. The secondary detector 306 coupled to the primary detector 304 has a second communication device 308b, a second processing device 310b, a second sensor 312b and a second wireless device 328b. The second sensor 312b and the second wireless device 328b are connected to the second processing device 310b to serve as a message communication. When the secondary detector 312b receives the signal-launching of the primary detector 304, the signal-launching is then sent to and identified by the second processing unit 310b. The second sensor 312b and the second wireless device 328b of the secondary 306 thus asynchronously transmit the first signal 202 and the second signal 204 to the first sensor 312a and the first wireless device 326a.

The hardware structure of the secondary detector 306 is typically similar to that of the primary detector 304 except the serial communication device connected to the computer 302. Specifically, the communication device, the processing device and the sensor have many different functions on the basis of required measurement. In the preferred embodiment of the present invention, the communication device includes a single chip, such as a series 8051 single chip, and a digital signal processor (DSP). The processing device also includes a programmable logic device (PLD), such as a complex PLD (CPLD), or a programmable memory 318, such as an EPROM, an EEPROM or non-volatile memory.

In addition, the sensor 312a, 312b includes an ultrasonic transducer-transmitted 330 and an ultrasonic transducer-received 334. When the ultrasonic transducer-received acquires ultrasonic waves from the ultrasonic transducer-transmitted, the ultrasonic waves are transformed into a voltage difference associated with the intensity and frequency of the ultrasonic waves and the frequency is determined by the clock of the ultrasonic transducer. In the present invention, the frequency is used to respond to the frequency response of the ultrasonic transducer-received.

Referring back to FIG. 3B, the first communication device 308a of the primary detector 304 has a serial communication device 314, a first controller 316a and a memory 318. The serial communication device 314 communicates with the computer 302 through the communication interface. The first controller 316a coupled to the first processing device 310a is used to initialize the first processing device 310a and to control the second signal 204 within the first processing device 310a. The memory 318 coupled to the first processing device 310a is able to store the time difference of the first signal 202 and the second signal 204 within the first processing device 310a.

Specifically, the first processing device 310a of the primary detector 304 has a first data converter 320a, a second data converter 322a and a counter 324. The first data converter 320a coupled to the first controller 316a further transforms the signal-launching command of the primary detector 304 so that the second data converter 322a coupled to the first controller 316a is allowed to transform the second signal 204 within the first sensor 312a. The counter 324 coupled to the first sensor 312a along with the memory 318 effectively computes the time difference of the first signal 202 and the second signal 204.

The first sensor 312a of the primary detector 304 has a first wireless device 326a, a first receiver 328a, a second receiver 330 and a master clock generator 332a. The first wireless device 326a coupled to the first data converter 320a is used to transmit the signal-launching command to the secondary detector 306. The first receiver 328a coupled to the second data converter 322a and the counter 324, respectively, is able to acquire the second signal 204 of the secondary detector 306. The second receiver 330 coupled to the counter 324 acquires the second signal 204 of the secondary detector 306 and the master clock generator 332a coupled to the first processing device 310a inputs a plurality of clock signals into the first processing device 310a.

Still referring back to FIG. 3C, the second sensor 312b of the secondary detector 306 has a second wireless device 328b, a first emitter 326b, a second emitter 334 and a slave clock generator 332b. The second wireless device 328b connected to the second processing device 310b can acquire the signal-launching command of the primary detector 304. The first emitter 326b coupled to the second processing device 310b responsive to the signal-launching command of the primary detector 304 transmits the second signal 204 into the primary detector 304. The second emitter 334 coupled to the second processing device 310b is capable of transmitting the second signal 204 of the secondary detector 306 into the primary detector 304. The slave clock generator 332b coupled to the second processing device 310b also inputs a plurality of clock signals into the second processing device 310b.

The second processing device 310b of the secondary detector 306 preferably has a third data converter 322b, a fourth data converter 320b, a synchronized device 336 and a frequency divider 338. The third data converter 322b coupled to the second wireless device 328b and the second communication device 308b, respectively, transforms the signal-launching command. The fourth data converter 320b coupled to the second emitter 326b and the second communication device 308b, respectively, is used to transform the first signal 202. Significantly, the synchronized device 336 coupled to the first emitter 326b and the second communication device 308b, respectively, transmits simultaneously the first signal 202 and the second signal 204 to the primary detector 304. The frequency divider 338 coupled to the slave clock generator 332b and the second communication device 308b, respectively, is effectively used to decrease a frequency of the second signal 204 for the second emitter 334. In a preferred embodiment, the slave clock generator 332b of the second processing device 310b provides frequency signals to set up the frequency and the number of the second signal 204.

The second communication device 308b of the secondary detector 306 has a second controller 316b, a first starter 340a and a second starter 340b. The second controller 316b coupled to the third data converter 322b and the fourth data converter 320b is used to initialize the second processing device 310b and to control the first signal 202 in the second processing device 310b. The first starter 340a coupled to the synchronized device 336 can start transmission of the synchronous command into the second emitter 326b. Additionally, the second starter 340b coupled to the frequency divider 338 commands the frequency divider 338 to allow the second emitter 334 to transmit the first signal 202 into the primary detector 304.

The first data converter 320a and the fourth data converter 320b are preferably digital to analog converter. The second data converter 322a and the third data converter 322b are preferably analog to digital converter. As a result, the signals including digital or analog signals can be readily converted each other for operation.

In the present invention, the measuring system for detecting an object distance utilizes a secondary detector 306 to transmit ultrasonic waves to the primary detector 304. However, a measuring system in the prior art uses reflected ultrasonic waves subject to noise resulting from the reflection of objects. By contrast, in the present invention, a direct transmission and separate reception of the first signal and the second signal has advantageously a noise-resistant feature in the environment and a high signal/noise ratio (SNR).

More importantly, since the velocity of the first signal 202 is considerably higher than that of the second signal 204 and a short transmission distance of the second signal (sound-speed wave) 204, the transmission time of the first signal 202 can be ignored but maintain a precise detecting so that the time calculation of the primary detector 304 and the secondary detector 306 is deemed as simultaneous. Therefore, the time difference from the primary detector 304 to the secondary detector 306 is the transmission time of the sound-speed waves. Furthermore, the time when the second signal is reflected on the primary detector 304 is much longer than that when the second signal 204 is transmitted to the primary detector 304. As a result, the initial measurement of the light-speed waves and sound-speed waves which arrive at the primary detector is able to avoid the interference with the reflective waves of the first signal 202. Consequently, the present invention is quite suitable for a complex and open space measurement and can be used widely in various detection applications.

More importantly, since the velocity of the first signal 202 is much smaller than that of the second signal 204, the time when the first signal 202 is reflected on the primary detector 304 is much longer than that when the second signal 204 is transmitted to the primary detector 304. As a result, when the primary detector 304 stops counting the signal, the first signal 202 has not yet been sent to the primary detector 304 to reduce effectively the reflection of the first signal 202 for a high precision distance measurement. Additionally, the primary detector 202 and the secondary detector 204 are positioned in measurement location and the objects to increase the usage flexibility.

Figure 4:
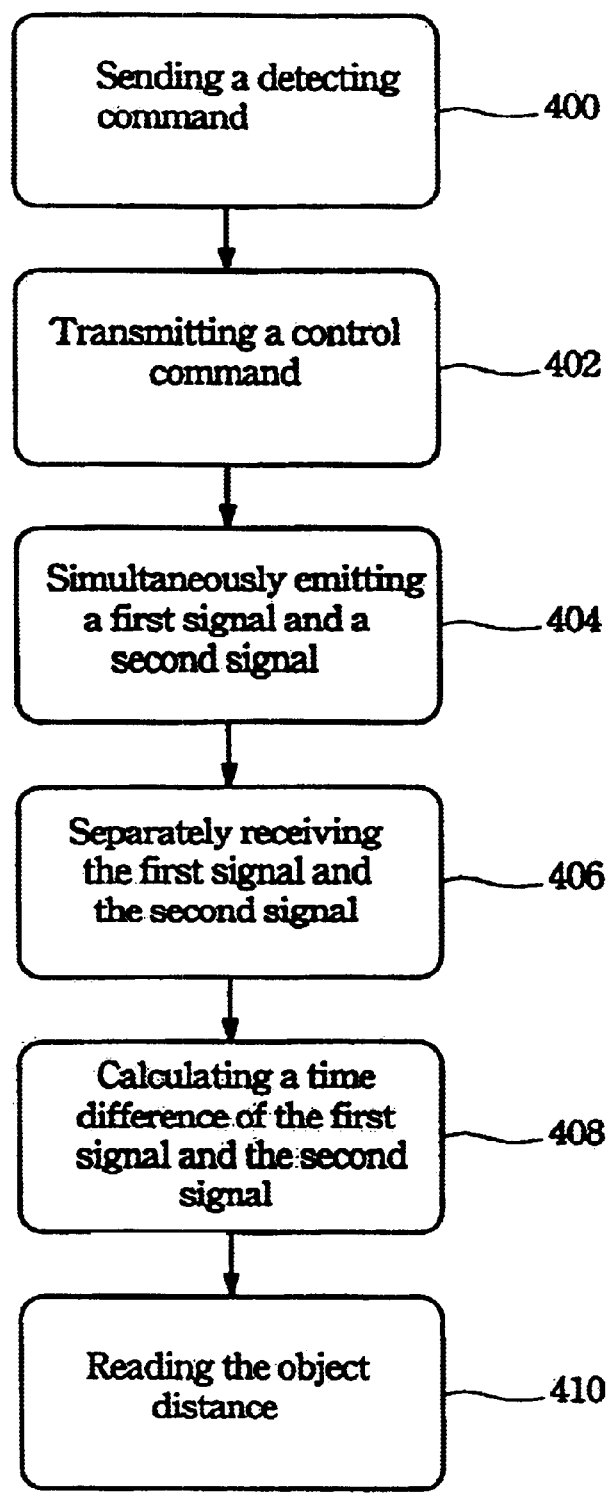
FIG. 4 is a flowchart for a measuring method to detect an object distance using different wave velocities in accordance with a preferred embodiment of the present invention.

FIG. 4 shows a flowchart of a measuring method to detect an object distance using different wave velocities in accordance with a preferred embodiment of the present invention, referring back to FIGS. 3A–3C. In step 400, the computer 302 sends a detection command to a primary detector 304 through a communication interface. In the preferred embodiment of the invention, the serial communication device 314 of the first communication device 308a is used to communicate with the computer 302. Further, the first controller 316a of the first communication device 308a initializes the first processing device 310a and controls the second signal 204 of the first processing device 310a.

Afterwards, in step 402, a signal-launching command is transmitted to a secondary detector 306 by the primary detector 304 to respond to the detection command of the computer 302. In other words, during the step of transmitting the signal-launching command, a first data converter 320a of the first processing device 310a converts the signal-launching command of the primary detector 304. In step 404, a first signal 202 and a second signal 204 are simultaneously emitted into the primary detector 304 by the secondary detector 306 to respond to the signal-launching command of the primary detector 304. In the preferred embodiment, before the step of simultaneously emitting a first signal 202 and a second signal 204, a second starter 340b of the second communication device 308b is allowed to start a frequency divider 338 of the second sensor 312b so as to transmit the first signal 202 to the secondary detector 306 by using the second emitter 334.

In step 406, the first signal 202 and the second signal 204 are respectively received from the secondary detector 306 using a first sensor 312a of the primary detector 304 and the velocity of the first signal 202 is much higher than that of the second signal 204. In a preferred embodiment, during the step of receiving the first signal 202 and the second signal 204, respectively, the second wireless device 328b of the second sensor 312b receives the signal-launching command of the primary detector 304. The third data converter 322b of the second processing device 310b then is able to convert the signal-launching command. The second controller 316b of the second communication device 308b then initializes the second processing device 310b and controls the second signal 204 in the second processing device 310b so that the fourth data converter 320b of the second processing device 310b is allowed to convert the second signal 204.

In addition, before the step of receiving the first signal 202 and the second signal 204, respectively, the first starter 340a starts transmission from a synchronized device 336 of the second communication device 308b of the synchronous command into a first emitter 326b of the second sensor 312b. The synchronized device 336 simultaneously transmits the first signal 202 and the second signal 204 into the primary detector 304 by the synchronized device 336.

In step 408, the first processing device 310a calculates the time difference between the first signal 202 and the second signal 204 sent to the first sensor 312a of the primary detector 304 to obtain an object distance equal to the product of the time difference and the velocity of the second signal 204. In a preferred embodiment, after the step of calculating the time difference between the first signal 202 and the second signal 204, the time difference between the first signal 202 and second signal 204 is stored in a memory 318 of the first communication device 308a. Finally, in step 410, the object distance is read in the primary detector 304 for display on the computer 302 by the communication interface.

In the same object distance measurement, the transmission length of the second signal 204 in the present invention is half of the object distance acquired by the reflective ultrasonic waves in the conventional measuring system. That is, the object distance is equal to the transmission length from the secondary detector 306 to the primary detector 304. During transmission, the decay of the second signal 204 is largely reduced to increase the signal/noise ratio in the same object distance measurement.

According to the above, the present invention utilizes a measuring system and method of detecting an object distance using transmitted media with different wave velocities. By contrast, in the present invention, a direct transmission and separate reception of the first signal and the second signal has advantageously a noise-resistant feature in the environment and a high signal/noise ratio (SNR).

Moreover, the transmission length of the second signal in the present invention is preferably half of the object distance acquired by the reflective ultrasonic waves in the prior art. During transmission, the decay of the first signal is largely reduced to increase an effective measuring distance of the objects. The light-speed medium serves as a communication media to establish a communication channel between the primary detector and the secondary detector. Such a communication channel can eliminate the unreasonable measurement result with errors to increase the measurement reliability.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A measuring system of detecting an object distance, wherein the measuring system uses a plurality of transmitted media used to transmit a first signal and a second signal, the measuring system comprising:

a computer for sending a detection command using a communication interface;

a primary detector having a first communication device coupled to the computer, a first processing device and a first sensor, wherein the first processing device is coupled to the first communication device and the first sensor, respectively, the primary detector transmits a signal-launching command responsive to the detection command of the computer resulting in the first sensor receiving the first signal and the second signal, and a velocity of the first signal is higher than that of the second signal to generate a time difference therebetween, the time difference being multiplied by the velocity of the second signal in the first processing device to obtain the object distance and displayed on the computer using the first communication device; and a secondary detector coupled to the primary detector and having a second communication device, a second processing device and a second sensor, wherein the second processing device is coupled to the second sensor and the second communication device, respectively, and the second communication device commands the second processing device to transmit a synchronous command responsive to the signal-launching command of the primary detector so that the second sensor simultaneously emits the first signal and the second signal to the first sensor of the primary detector.

2. The measuring system of claim 1, wherein the first communication device of the primary detector comprises:

a serial communication device to communicate with the computer using the communication interface;

a first controller coupled to the first processing device to initialize the first processing device and control the second signal within the first processing device; and a memory coupled to the first processing device to store the time difference between the first signal and the second signal within the first processing device.

3. The measuring system of claim 2, wherein the first processing device of the primary detector comprises:

a first data converter coupled to the first controller to transform the signal-launching command of the primary detector;

a second data converter coupled to the first controller to transform the first signal within the first sensor; and a counter coupled to the first sensor and the memory to compute the time difference between the first signal and the second signal in the first processing device.

4. The measuring system of claim 3, wherein the first sensor of the primary detector comprises:

a first wireless device coupled to the first data converter to transmit the signal-launching command to the secondary detector;

a first receiver coupled to the second data converter and the counter, respectively, to acquire the first signal of the secondary detector;

a second receiver coupled to the counter to acquire the second signal of the secondary detector; and a master clock generator coupled to the first processing device to input a plurality of clock signals into the first processing device.

5. The measuring system of claim 1, wherein the second sensor of the secondary detector comprises:

a second wireless device coupled to the second processing device to acquire the signal-launching command of the primary detector;

a first emitter coupled to the second processing device responsive to the signal-launching command of the primary detector to transmit the first signal to the primary detector;

a second emitter coupled to the second processing device to transmit the second signal of the secondary detector to the primary detector; and a slave clock generator coupled to the second processing device to input a plurality of clock signals into the second processing device.

6. The measuring system of claim 5, wherein the second processing device of the secondary detector comprises:

a third data converter coupled to the second wireless device and the second communication device, respectively, to transform the signal-launching command;

a fourth data converter coupled to the second emitter and the second communication device, respectively, to transform the first signal;

a synchronized device coupled to the first emitter and the second communication device, respectively, to transmit simultaneously the first signal and the second signal to the primary detector; and a frequency divider coupled to the slave clock generator and the second communication device, respectively, to decrease a frequency of the second signal for the second emitter.

7. The measuring system of claim 6, wherein the second communication device of the secondary detector comprises:

a second controller coupled to the third data converter and the fourth data converter to initialize the second processing device and control the first signal in the second processing device; and a first starter coupled to the synchronized device to start transmission of the synchronous command to the first emitter from the synchronized device of the second processing device; and a second starter coupled to the frequency divider to start transmission of the second signal from the frequency divider to the primary detector by the second emitter.

8. The measuring system of claim 1, wherein the object distance comprises a transmission length of the second signal emitted from the secondary detector to the primary detector.

9. The measuring system of claim 1, wherein the second signal comprises an ultrasonic wave.

10. The measuring system of claim 1, wherein the first signal comprises a light-speed wave.

11. The measuring system of claim 10, wherein the light-speed wave is an infrared wave, a radio wave or a combination thereof.

12. A measuring system for detecting an object distance by a plurality of transmitted media used to emit a first signal and a second signal, wherein a computer sends a detection command using a communication interface, the measuring system comprising:
   a primary detector having a first communication device coupled to the computer, a first processing device and a first sensor, wherein the first processing device is coupled to the first communication device and the first sensor, respectively, and the primary detector transmits a signal-launching command responsive to the detection command of the computer resulting in the first sensor receiving the first signal and the second signal and a velocity of the first signal being higher than that of the second signal to generate a time difference therebetween, the time difference being multiplied by a velocity of the second signal in the first processing device to obtain the object distance and displayed on the computer using the first communication device; and
   a secondary detector coupled to the primary detector and having a second communication device, a second processing device and a second sensor, wherein the second processing device is coupled to the second communication device and the second sensor, respectively, and the second communication device starts transmission of a synchronous command responsive to the signal-launching command of the primary detector from the second processing device resulting in the second sensor simultaneously emitting the first signal and the second signal to the first sensor of the primary detector.

13. The measuring system of claim 12, wherein the object distance comprises a transmission length of the second signal emitted from the secondary detector to the primary detector.

14. The measuring system of claim 12, wherein the second signal comprises an ultrasonic wave.

15. The measuring system of claim 12, wherein the first signal comprises a light-speed wave.

16. The measuring system of claim 15, wherein the light-speed wave is one selected from the group consisting of an infrared wave, a radio wave and the combination.

17. A measuring method for detecting an object distance by a plurality of transmitted media including different wave velocities used to emit a light-speed wave and a sound-speed wave, the method comprising the steps of:
   sending a detection command to a primary detector by a communication interface in a computer wherein the primary detector has a first communication device, a first processing device and a first sensor;
   transmitting a signal-launching command to a secondary detector by the primary detector to respond to the detection command of the computer, wherein the secondary detector has a second communication device, a second processing device and a second sensor;
   simultaneously emitting a light-speed wave and a sound-speed wave into the primary detector by the secondary detector to respond to the signal-launching command of the primary detector;
   receiving the light-speed wave and the sound-speed wave from the secondary detector by a first sensor of the primary detector, respectively, wherein a velocity of the light-speed wave is higher than that of the sound-speed wave;
   calculating a time difference between the light-speed wave and the sound-speed wave in the first sensor of the primary detector to obtain an object distance, wherein the time difference is multiplied by the velocity of the sound-speed wave; and
   reading the object distance by using the first communication device of the primary detector via the communication interface for displaying on the computer.

18. The measuring method of claim 17, before the step of receiving the light-speed wave and the sound-speed wave, respectively, further comprising the steps of:
   starting a synchronized device of the second communication device by the first starter to transmit the synchronous command to a first emitter of the second sensor; and
   simultaneously transmitting the light-speed wave and the sound-speed wave from the synchronized device to the primary detector.

19. The measuring method of claim 17, after the step of calculating a time difference of the light-speed wave and the sound-speed wave, further acquiring the time difference between the light-speed wave and sound-speed wave, wherein the time difference is stored in a memory of the first communication device.

20. The measuring method of claim 17, wherein the object distance is equal to a transmission length of the sound-speed wave emitted from the secondary detector to the primary detector.

* * * * *